INVENTOR.
LYSLE V. ANDERSON.

INVENTOR.
LYSLE V. ANDERSON.
BY Richey & Watts
ATTORNEYS.

United States Patent Office 2,782,488
Patented Feb. 26, 1957

2,782,488

STRIP SPLICER

Lysle V. Anderson, Warren, Ohio, assignor to E. W. Bliss Company, Canton, Ohio, a corporation of Delaware Continuation of abandoned application Serial No. 35,442, June 26, 1948. This application August 3, 1954. Serial No. 447,572

4 Claims. (Cl. 29—33)

This invention relates to forming metal strip material and to joining lengths of strip to form continuous strips. This application is a continuation of Anderson application Serial No. 35,442 filed June 26, 1948, now abandoned, entitled Strip Splicer.

An object of the invention is to join the ends of strips of steel or any weldable metal quickly, accurately and easily while producing a high quality weld. A further object of the invention is to shear or crop the ends of metal strip with the cut edge of one strip in exact alignment with the cut edge of another metal strip, with exact conformity of the strip at the cut edge for welding the edges with a minimum of irregularity of welding and for forming welds which are uniform along the length thereof and of high quality. A further object is to form successive welded joints which are alike in the formation of continuous metal strip.

Still another object of the invention is to provide metal strip welding apparatus which is relatively compact, occupying substantially no more space than the width of the strip, which is readily operated and in which the successive operations may be carried out automatically.

Still another object of the invention is to provide inexpensive and simple apparatus for the formation of continuous metal strip material. It is an object also to enable various processes in connection with metal strip treating and handling to be carried out continuously. Still another object of the invention is to hold the ends of two lengths of metal strip along the edges very rigidly and securely with exact alignment with each other and in the same alignment as when sheared, as well as to avoid jarring said strip during the shearing. Still another object of the invention is to produce a slight spacing of the cut edges of strip to be welded to improve the welding operation in certain gauges of material while accurately retaining the alignment of the cut edges.

Still another object of the invention is to clean the edges of the metal strip before welding and to clean the welded edges without necessitating additional manipulation of the strip or additional operation of the apparatus. Other objects, features and advantages of the invention will become apparent as the description proceeds.

It has been customary in steel mills to cast the steel in ingots and to reduce the ingots to blooms, slabs and thick sheets, successively, by hot rolling. In order to produce sheets or strips, especially in thickness of less than .030, for example, further reduction by cold rolling has been employed, usually after passage through a pickling line. Feeding the lengths of hot-rolled metal into the cold-reducing rolls and refeeding the lengths of strip into rolls for additional passes and further cold reduction are, however, difficult and time consuming operations. It is an object of my invention to avoid the necessity for such frequent refeeding of strips.

Moreover, repeated passing through the rolls of "tails" or ends of the lengths of strip mars the roll surface and causes corresponding imperfections to be rolled into the surfaces of strips thereafter rolled, rendering the material much less valuable. There is also a tendency for the material at the leading and trailing ends of each length of strip to have irregularities in thickness as compared with the remainder of the strip. Accordingly, one of the objects of my invention is to avoid injury to rolls and to form a superior substantially flawless metal strip product.

My arrangement is of great value in improving and rendering more efficient rolling operation upon steel and other metals, especially cold rolling. Nevertheless, my invention is not limited thereto and has for its object producing long or continuous lengths of metallic strip for any purpose where continuous operations are desired.

In carrying out the invention in accordance with a preferred form thereof, I provide a machine in the steel strip processing line in advance of the cold reducing rolls, which forms lengths of metal strips into a continuous metal strip. If one of my machines is inserted ahead of a pickling line it enables the pickling operation to be continuous and at the same time builds large coils for efficient cold rolling operations. I provide a pair of longitudinally spaced clamps with a platform in between carrying, shearing and the welding means. The platform is made longitudinally reciprocable through a distance corresponding to the spacing between the shearing means and the welding means. The lengths of strip are fed through the clamps and the shearing means. The leading end of one length of strip may be overlapped with the tail end of the previous length of strip between the blades of the shearing means while the platform is in a position for operation of the shearing means.

The ends of the lengths of strip are sheared so that the edges coincide in position and conform in shape. If the ends of the strips are lapped, the strips are sheared simultaneously, if they are not lapped, they are sheared successively. Without unclamping the strip and assuring the retention of the abutting cut edges in the proper relation for high quality welding, the platform is moved longitudinally so as to cause the welding means to assume the position previously occupied by the shearing means. Weld heat is then applied progressively along the length of the cut edges so as to form a seam or welded joint which is produced with the cut ends of the strip in exactly the same position which they occupied when cut by the shearing means.

The shearing means and the clamps are so constructed that when the jaws of the clamp are closed for securing the lengths of strip they remain in the same plane as the cutting edge of the shearing means, thus, substantially avoiding any deflection or bending of the strip from its clamped position during the shearing operation. Also the shear is operated by fluid pressure means, which applies constant force during the cutting stroke, so as to avoid any shock or jarring which might tend to dislodge the strip material from the position in which it was held by the clamps.

In welding thin strip material, it is ordinarily desirable to have the cut edges at the ends of the strip substantially in contact for welding. However, in the case of some of the heavier gauges, it is at times desirable to space the ends of the crop strip slightly and to hold them so spaced during the welding operation while, however, preserving the exact alignment and parallelism of the ends of the strip. For accomplishing this, I mount one of the clamps so that it may have imparted thereto, a limited reciprocation in the direction of strip travel and I avoid any necessity for employing expensive constructions or separate manipulation to move the clamp. In accordance with a preferred embodiment of the invention, the clamp is arranged so that it may be engaged by the reciprocating shear and weld unit as it moves from the shearing position to the welding position, which engagement carries the clamp and associated strip section so that the crop ends are slightly spaced a precisely controlled distance, when so desired.

Another feature of a preferred form of the present invention is the provision of means for cleaning the cropped ends before welding the means for cleaning the completed weld. This is accomplished by the mounting of a vacuum-blast nozzle, using sand or any suitable abrasive, adjacent the welding head which traverses the strip top and bottom simultaneously just ahead of the welding electrode to clean the edges thereof, and travels back to clean the completed weld on retraction of the welding carriage to its starting position.

The manner in which the aforesaid features and advantages are effected will be apparent from the following detailed description of a preferred embodiment of my invention.

In the drawings:

Figure 3a is a partial side view showing the chain mounting for the sand-blast apparatus;

Figure 7 is a partial section taken on 7—7 of Figure 3; and,

Figure 8 is a partial plan view of the movable clamp.

Figure 1:
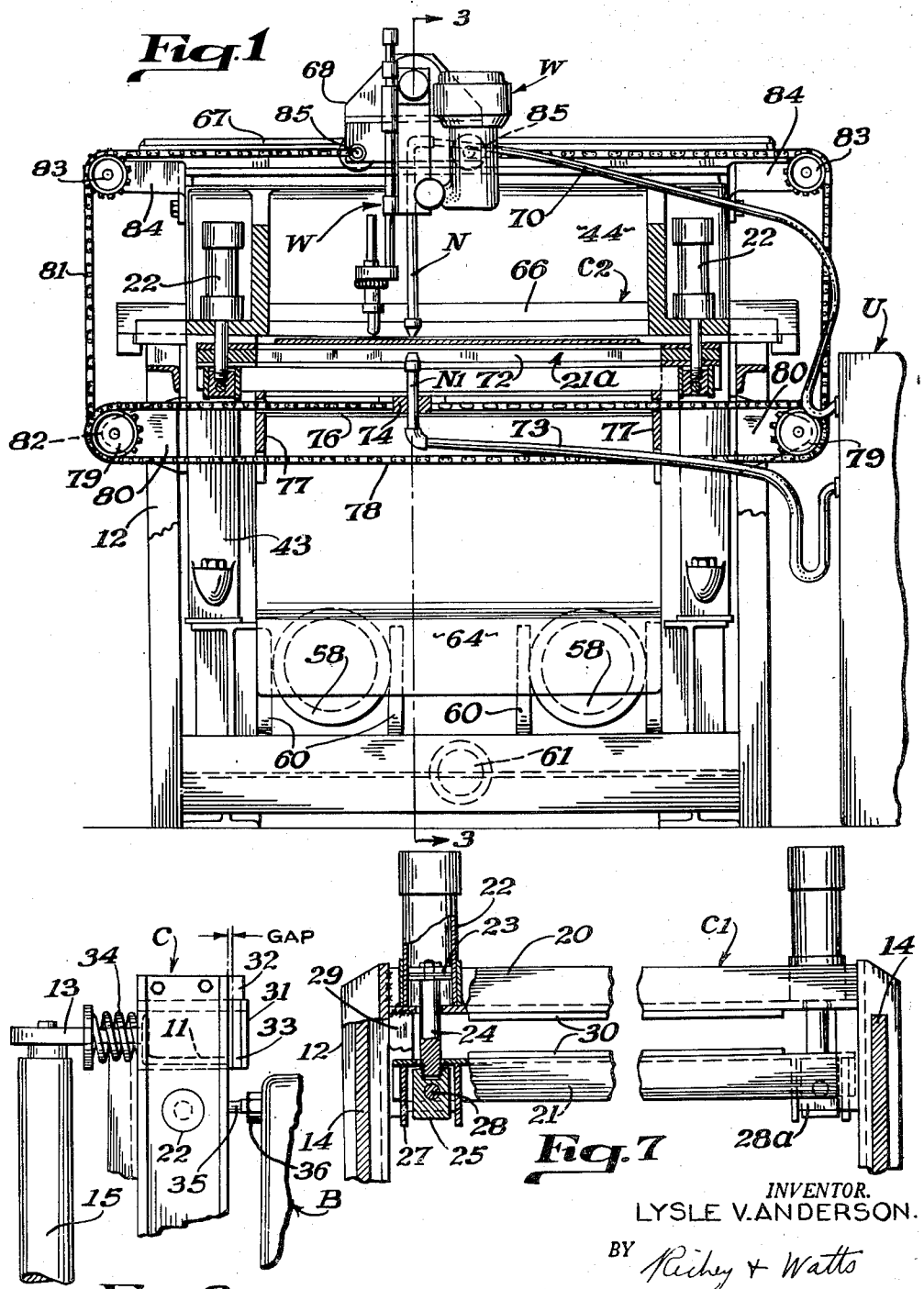
Figure 1 is an end elevation of the apparatus looking against the direction of strip travel therethrough.

The form of apparatus illustrated in the drawings comprises several major units, such as the clamp and bed unit A mounting strip clamps C and $C_1$, the shear and welding unit B on a carriage slidable between the clamps C and $C_1$, the welding clamp $C_2$ and the welding head W. A fixed bed structure 10 carries clamp-supporting uprights 11 and 12 for clamps C and $C_1$ respectively. As illustrated in the drawing the bed structure 10 and clamp supports are of massive rigid channel or angle bar construction, providing rigidity of the strip clamping and guarding against misalignment of the strip, axial or otherwise. Brackets 13 and 14 at opposite ends of the apparatus support entry and exit rollers 15 and 16 respectively. A welding clamp $C_2$ is mounted on the unit B for positively holding the ends of the strips during welding. Clamps C and $C_1$ include upper and lower jaws or plate members 20 and 21, and these are actuated by fluid motors 22.

As seen in Figure 7, a piston 23 is provided in each cylinder 22 which carries a piston rod 24 connected to a block 25. Block 25 is pivoted to webs 27 on the lower clamp jaws 21 by means of plates 28a and a pin 28, in order to permit self-alignment. The guides 29 are supported on uprights 12 for the lower check. All the clamp-operating motors are similar, and it is understood that suitable fluid connections, control valves and the like are provided in accordance with conventional engine practice. The fluid connections and controls may be arranged in accordance with conventional machine tool practices and are not included in the drawings in the interests of clarity.

Figure 2:
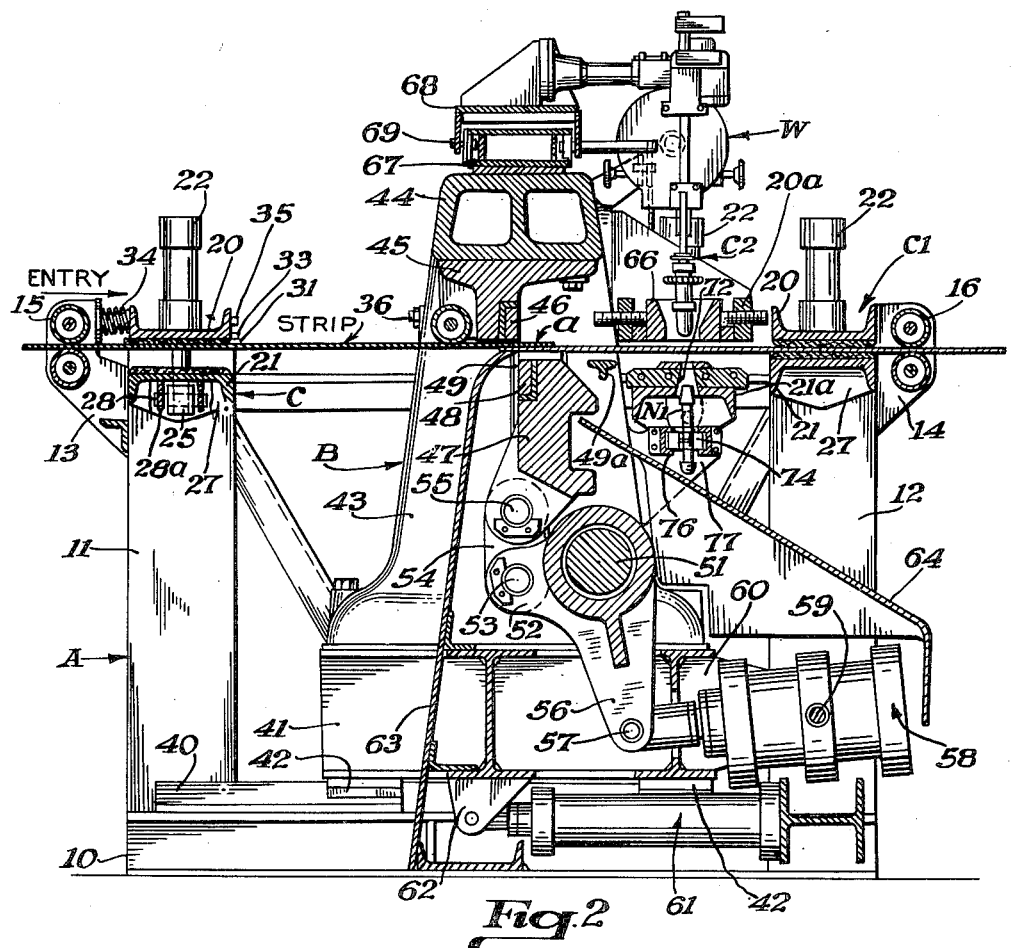
Figure 2 is a central longitudinal section through the apparatus just before the rearward clamp is closed in readiness for the shearing operation.
Figure 5:
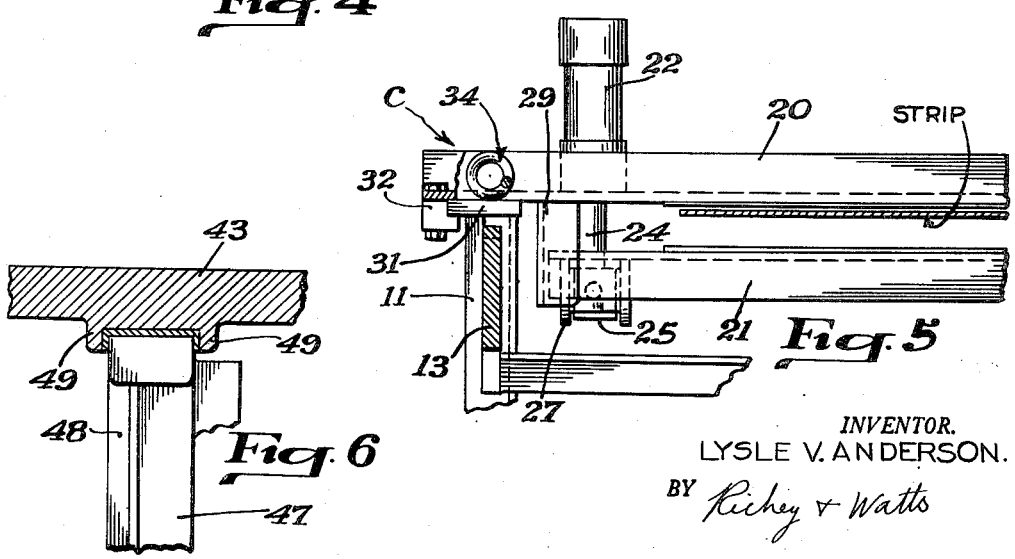
Figure 5 is a partial section taken on 5—5 of Figure 3.

As best seen in Figures 2, 5 and 8, movable clamp C comprises an upper jaw 20 resting on a fixed platform 31 that carries a guide member 32. There is a stop flange 33 at one end of platform 31, and spring 34 is mounted on bracket 13 and urges the clamp toward the stop flange. The block 35 is fastened to the clamp for engagement by an adjustable stud 36 mounted on the reciprocating carriage unit B.

Suitable ways 40 are mounted on bed 10 for supporting the bed frame 41 by means of guide blocks 42. The shear frame casting 43 is fastened to the bed 41, and has a transverse arch member 44 upon which is fixed the fixed shear block 45 which carries the hardened shear knife 46. The movable shear block 47 likewise carries a hardened knife 48 and rides between guide member 49 in the casting 43. It will be observed from the drawing that the upper jaws or plate members 20 of the strip holding clamps C and $C_1$ are stationary and their lower surfaces lie in a common plane, the lower jaws or plate members 21 being movable. It will also be seen from the drawings that likewise, the upper shear blade or knife 46 has a horizontal cutting edge lying in the plane defined by the lower surfaces of the upper clamp jaws or plate members 20, and that lower shear blade or knife 48 is movable. It is to be understood, however, that my invention is not limited to the specific arrangement illustrated and does not exclude the alternative arrangement in which the upper members instead of the lower members of the clamp and shearing means are vertically movable so long as the vertically fixed members remain fixed in their positions with their edges or surfaces contacting, or adapted to contact, the strip material lying in the same plane during the shearing operation. It will be understood that a slight rake of the cutting edge of the upwardly movable shearing blade or knife 48 is desirable in order to obtain true shearing action.

In order to cause reciprocation of the movable shear, a rigid cross-shaft 51 is mounted in the shear frame and supports bell-crank lever 52, the latter being connected for causing reciprocation of the shear block by means of pin 53, link 54 and pin 55. The lower arm 56 of bell-crank lever 52 is pivotally connected to a piston rod forming part of a shear-operating fluid motor 58, mounted on trunnions 59 in suitable brackets 60.

In order to cause reciprocation of the shear and welding unit, ears 62 are attached to the bed 41 thereof, and receive a piston rod forming part of fluid motor 61. It is understood that the fluid motors are double-acting, provided with suitable source of fluid, preferably hydraulic oil, under pressure and controls. Suitable deflecting plates 63 and 64 may be added to prevent the cropped ends of the strips from jamming the mechanism.

In order that the welding head W may traverse the strip, a track 67 is mounted on cross member 44 which supports a carriage 68 by means of rollers 69. Constructional details of a suitable welding apparatus are known in the art and form no part of the invention.

Figure 3:
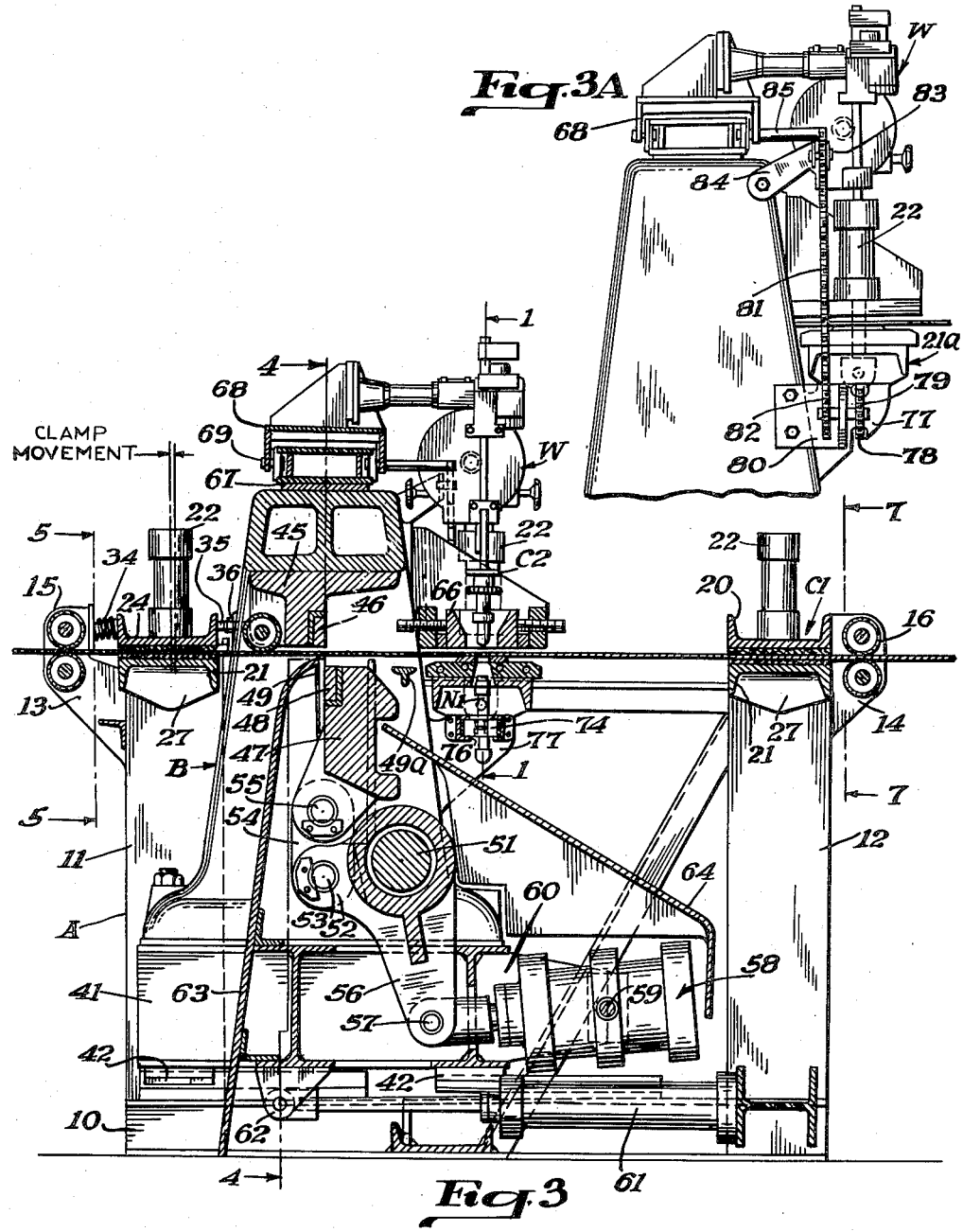
Figure 3 is a similar section with all clamps closed and the parts positioned in readiness for the welding operation.
Figure 4:
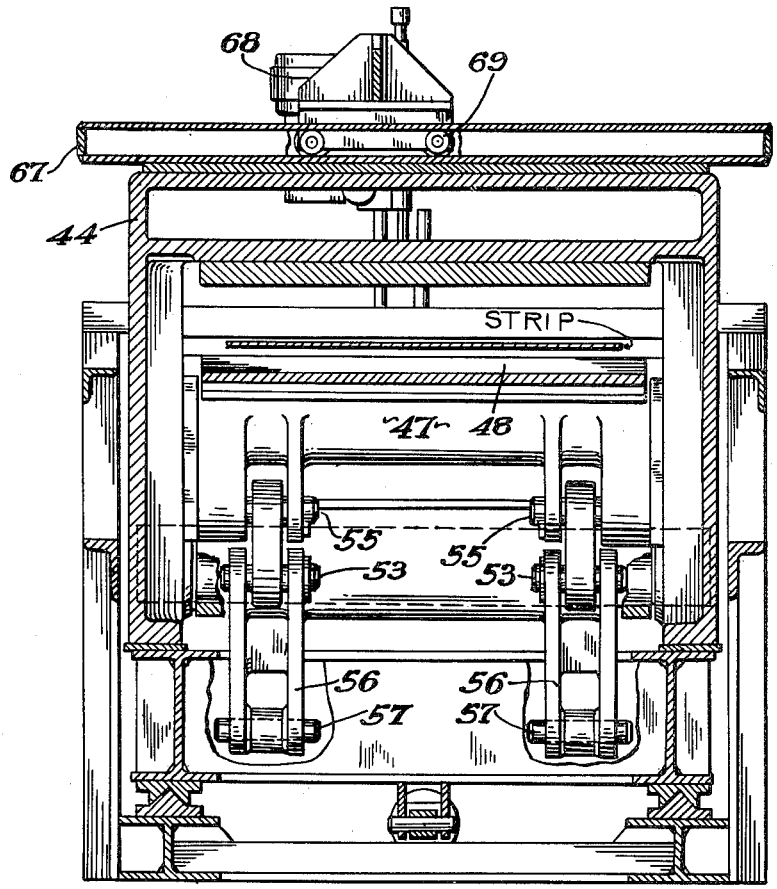
Figure 4 is a transverse section taken on 4—4 of Figure 3.
Figure 6:
Figure 6 is a partial section showing the shear guide.

As best seen in Figure 1, the mechanism for cleaning up the weld comprises, in the preferred form, upper and lower sandblast nozzles N and $N_1$ respectively. Nozzle N is mounted by any convenient means on the welding head W for motion with the carriage 68 and connects by means of conduit 70 to what is commonly referred to as a vacuum-blast unit U. As seen in Figures 2 and 3, the lower member 21 of clamp $C_2$ is slotted as at 72 to accommodate the lower nozzle $N_1$, the latter being connected by means of conduit 73 to the vacuum-blast unit U. I prefer that the sand-blast unit U and its nozzles be of the vacuum-blast type, namely the type wherein each blast nozzle is surrounded by a vacuum return duct for the abrasive material.

In order that nozzle $N_1$ may move in synchronism with the carriage, a chain assembly is included. This assembly comprises a traveling block 74 mounting the lower nozzle which rides in channel guide means 76 supported at each end by suitable brackets 77. A chain 78 connects at each end to the block 74 and passes around a pair of sprockets 79 mounted on suitable brackets 80. In order to synchronize the motion of the two nozzles, a second chain 81 passes around the pair of lower sprockets 82, which sprockets together with sprockets 79 are mounted on outboard brackets 80. The chain also passes over an upper pair of sprockets 83 mounted on suitable outboard brackets 84, the ends of the chain being made fast to suitable means 85 associated with the carriage 68. It can be seen that with this simple arrangement the nozzles N and N₁ move together, and yet the overall lateral dimension of the apparatus is not materially increased.

The operation of the apparatus will now be briefly described. As seen in Figure 2, with the machine in shearing position when the end of the strip is drawn through the machine the strip feed is stopped and clamp C₁ is closed on strip. The leading edge of another strip is introduced through rollers 15. The two strips are lapped as at (a) beneath the shear knives and the apparatus is disposed as in Figure 2. The upper rollers of the pairs of rollers 15 and 16 guide the strip along the lower surfaces of the upper clamp jaws 20, the lower jaws 21 being in the lower position represented in Figure 2 at the left when the strip is fed in, so that ample clearance is provided. Clamp C is now closed by proper manipulation of the controls to firmly retain the strip in position lying within the plane defined by the lower surfaces of the fixed upper clamp jaws 20. This plane also includes the cutting edge of the upper shear blade 45. The welding clamp C₂ remains open at this stage.

The controls for the shear motor 58 are then set to crop the ends of the strip in perfect alignment. Since the strip material was held in a fixed plane prior to the shearing and the cutting edge of the shearing blade 46 lies within the same plane, the upward movement of the movable shear blade 48 does not deflect the strip from this plane (except for the very slight rake which may be provided in the blade 48). Thus, there is substantially no distortion of the strip either during preparation for shearing or during the shearing operation. The cut edges, therefore, are not only in alignment and cut to conform to each other but remain in alignment and in abutting relation after the shearing operation has been completed. Clamps C and C₁ are left in the closed position and the controls for the carriage motor 61 operated to move the carriage back to the position shown in Figure 3. Since the clamps "C" and "C₁" have remained in a fixed position and are not moved, nor is the strip moved, the crop ends of the strip remain in conforming position as sheared, aligned and in abutting relation for enabling high quality welding to be produced. The clamps being actuated by fluid pressure cylinders, grip the strip material very rigidly and securely. Moreover, owing to the fact that the shearing mechanism is also actuated by a fluid pressure motor, shown as a hydraulic cylinder and piston unit, a uniform force is applied to the movable shear blade throughout the cutting stroke. There is no falling off in the force applied or is there any need for excessive momentum of the apparatus to insure completion of the cutting stroke. Thus, there is no jarring or jolting which might tend to disturb the position of alignment of the lengths of strip, nor is there any tendency to jar the strip out of the jaws of the clamps C and C₁. Toward the end of this motion, stud 36 strikes block 35 on adjustable clamp C and carries it rearwardly a short distance, indicated by legend "clamp movement" at Figure 3. This spaces the closed ends of the strips an equivalent distance, and the parts are adjusted so that the spacing is proper for the weld. The cropped ends of the strip retain their accurate alignment and parallelism.

Now the welding clamp C₂ is closed to grip the spaced ends firmly and the welding carriage W traverses the strip from left to right in Figure 1. During this action abrasive material flowing from the nozzles N and N₁ cleans both the upper and lower edges of the strip ahead of the weld and the welding head welds the cropped ends together. As shown in the drawing the jaw surface of the clamp C₂ lies in the plane defined by the surfaces of the clamping jaws 20. There is no danger that axial alignment of the strips will be altered by sidewise movement of the strip ends or otherwise, so as to cause spacing between the sheared edges which is uneven or so as to cause overlap at one side and a gap at the other side between the sheared edges. This results from the fact that, not only the supports for the strip clamps, but also the supports for the entire body of the metallic strip including the coil (not shown), from which strip is drawn, and the mandrel and coil (not shown) onto which the welded continuous strip is wound, remain in the same location and position after the shears have acted and when welding takes place. There is no need to coil and uncoil strip to permit strip movement, because the welding head is moved to the location of the sheared edges.

After the carriage has completed its motion across the strip, it is retracted with the welding current cut off but the stream of abrasive particles may be maintained which cleans the weld and places the strip in condition whereby no blemishes or inclusions will be apparent after rolling of the strip.

Having completed a detailed description of a preferred embodiment of my invention, it can be seen that I have provided a machine that occupies relatively little floor space and is readily operated and controlled. The length of the machine is relatively small and no manipulation is required on the part of the operator to cause proper spacing of the strips for welding.

It will be understood that the aforesaid description of a preferred embodiment is necessarily complete, but that various changes may be made without affecting the mode of operation and without departing from the essence of the invention. Accordingly, I contemplate that the appended claims and not the aforesaid embodiment be determinative of the scope of the invention.

I claim:

1. Apparatus for splicing metal strips comprising support structure, a pair of longitudinally spaced stationary strip clamps supported on said structure, a strip shear and welding unit having longitudinally spaced shear and welding means disposed between said clamps, a support for said unit reciprocal toward one of said clamps and away from another by a distance substantially equal to the spacing between said shear and welding means, the strip clamp nearest the shear means being mounted for limited longitudinal reciprocation to space the sheared ends of strips for welding, abutment means on said unit for engaging and moving said movable clamp, and resilient means arranged to oppose said motion of the clamp.

2. Apparatus for splicing metal strips comprising a first unit mounting a pair of longitudinally spaced stationary strip clamps, a second unit mounting longitudinally spaced shear and welding means and being disposed between said clamps, a support for one of said units reciprocable relative to the other unit by a distance substantially equal to the spacing between said shear and welding means, means mounting one of said clamps for limited free sliding motion in the direction of reciprocation of said reciprocable unit, said mounting means and said reciprocable unit having abutment members adapted to come into contact when the reciprocable unit is near the end of its stroke, so as to cause said sliding clamp to move in a direction away from said welding means upon reciprocation of said reciprocable unit.

3. Apparatus for splicing metal strips comprising a first unit mounting a pair of spaced strip clamps, a second unit mounting longitudinally spaced shear and welding means and being disposed between said clamps, means mounting said welding means for traversal of said strip, a support for one of said units reciprocal relative to the other unit by a distance substantially equal to the spacing between said shear and welding means, a sandblast nozzle mounted ahead of and adjacent said welding means for traversing the strip therewith, means mounting one of said clamps for limited free sliding motion in the direction of reciprocation of said one unit, said mounting means being arranged to cause said sliding clamp to move in a direction away from said welding means upon reciprocation of said one unit.

4. Apparatus for splicing metal strips comprising a first unit mounting a pair of spaced strip clamps, a second unit mounting longitudinally spaced shear and welding means and being disposed between said clamps, means mounting said welding means for traversal of said strip, a support for one of said units reciprocal relative to the other unit by a distance substantially equal to the spacing between said shear and welding means, abrasive blast nozzles mounted above and below the path of the strip, means mounting one of said nozzles for motion with said welding means, means mounting said lower nozzle for motion along the weld line, a pair of connected sprockets mounted at each side of said apparatus, a chain length passed over one sprocket of each pair with its ends attached to said lower nozzle mounting means, a second pair of sprockets one being mounted at each side of said apparatus and disposed above said first-named sprockets, and a second chain passed over the other of said connected sprockets and over said upper sprockets with its ends connected with said welding means.

References Cited in the file of this patent
UNITED STATES PATENTS

| | | |
|---|---|---|
| 1,936,314 | Sykes | Nov. 21, 1933 |
| 2,078,365 | Biggert et al. | Apr. 27, 1937 |
| 2,143,969 | Biggert | Jan. 17, 1939 |